US011487918B2

(12) United States Patent
Santhar et al.

(10) Patent No.: US 11,487,918 B2
(45) Date of Patent: Nov. 1, 2022

(54) RESULTANT DIGITAL REPLICA

(71) Applicant: International Business Machines Corporation, Armonk, NY (US)

(72) Inventors: Sathya Santhar, Chennai (IN); Samuel Mathew Jawaharlal, Chennai (IN); Balamurugaramanathan Sivaramalingam, Paramakudi (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 17/017,837

(22) Filed: Sep. 11, 2020

(65) Prior Publication Data

US 2022/0083707 A1    Mar. 17, 2022

(51) Int. Cl.
*G06F 30/20*    (2020.01)
*G06F 111/20*    (2020.01)

(52) U.S. Cl.
CPC .......... *G06F 30/20* (2020.01); *G06F 2111/20* (2020.01)

(58) Field of Classification Search
CPC .............................. G06F 30/20; G06F 2111/20
See application file for complete search history.

(56) References Cited

U.S. PATENT DOCUMENTS

| | | | |
|---|---|---|---|
| 10,016,694 B2 | 7/2018 | Bach | |
| 2019/0138667 A1 | 5/2019 | Benesh | |
| 2019/0163147 A1* | 5/2019 | D'Amato | G05B 19/41885 |
| 2019/0236489 A1 | 8/2019 | Koudal | |
| 2019/0251489 A1* | 8/2019 | Berti | H04L 9/3239 |
| 2020/0265329 A1* | 8/2020 | Thomsen | G06N 5/048 |
| 2021/0096543 A1* | 4/2021 | Stump | G06Q 10/06 |

FOREIGN PATENT DOCUMENTS

WO    2018183275 A1    10/2018

OTHER PUBLICATIONS

"Digital twin technology and simulation: benefits, usage and predictions", i-SCOOP, printed Feb. 7, 2020, 6 pages, <https://www.i-scoop.eu/digital-twin-technology-benefits-usage-predictions/>.
Kennedy, Kara, "What is Digital Twins (+Impact on Business Modernization)", G2 Learning Hub, retrieved from the Internet on Feb. 12, 2020, 4 pages, <https://learn.g2.com/trends/digital-twins>.
Mevea, "How can Digital Twin technology improve your business?—Digital Twin explained", YouTube, posted Oct. 11, 2018, 3 pages, <https://www.youtube.com/watch?v=fEl5oz33la8>.

* cited by examiner

*Primary Examiner* — Chuen-Meei Gan
(74) *Attorney, Agent, or Firm* — Edward P. Li (57) ABSTRACT

A method, computer program product, and/or system is provided for generating a resultant digital replica model, comprising: accessing a plurality of digital replica models; receiving a selection of components associated with a first digital replica model of the plurality of digital replica models; receiving a selection of components associated with a second digital replica model of the plurality of digital replica models; generating a resultant digital replica model based at least in part on the selection of components associated with the first digital replica model and the selection of components associated with the second digital replica model; and simulating physical operations based on the resultant digital replica model.

17 Claims, 3 Drawing Sheets

RESULTANT DIGITAL REPLICA

BACKGROUND

The present invention relates generally to the field of digital modeling, and more particularly to providing a resultant digital twin model.

A digital twin provides an exact virtual/digital replica of a physical entity (e.g., product, process, service, and/or the like) creating a link between the physical and digital worlds. A digital twin enables simulation, testing, modeling, analysis, and/or monitoring based on data generated by and/or collected from the digital twin. For example, a digital twin can allow for testing and/or modifying a proposed design without necessitating creation of the physical entity.

SUMMARY

According to an aspect of the present invention, there is a method, computer program product and/or system for providing a resultant digital replica model that performs the following operations (not necessarily in the following order): accessing a plurality of digital replica models; receiving a selection of components associated with a first digital replica model of the plurality of digital replica models; receiving a selection of components associated with a second digital replica model of the plurality of digital replica models; generating a resultant digital replica model based at least in part on the selection of components associated with the first digital replica model and the selection of components associated with the second digital replica model; and simulating physical operations based on the resultant digital replica model.

DETAILED DESCRIPTION

According to aspects of the present disclosure, systems and methods can be provided to generate a resultant digital twin (e.g., digital replica) model based at least in part on identified components from two or more stored digital twin models (e.g., combining component A from model X, component B from model Y, etc. in a new device). A digital twin model provides a virtual/digital replica or representation of a physical entity (e.g., product, process, service, and/or the like) creating a link between the physical and digital worlds. In particular, systems and methods of the present disclosure can provide for adapting the selected components from two or more stored digital twin models to meet specified requirements of a proposed product, process, or service. The systems and methods of the present disclosure can provide for simulating operations for a resultant digital twin model and identifying performance issues, enhancement, modification, and/or the like for the product, process, or service. This Detailed Description section is divided into the following sub-sections: The Hardware and Software Environment; Example Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
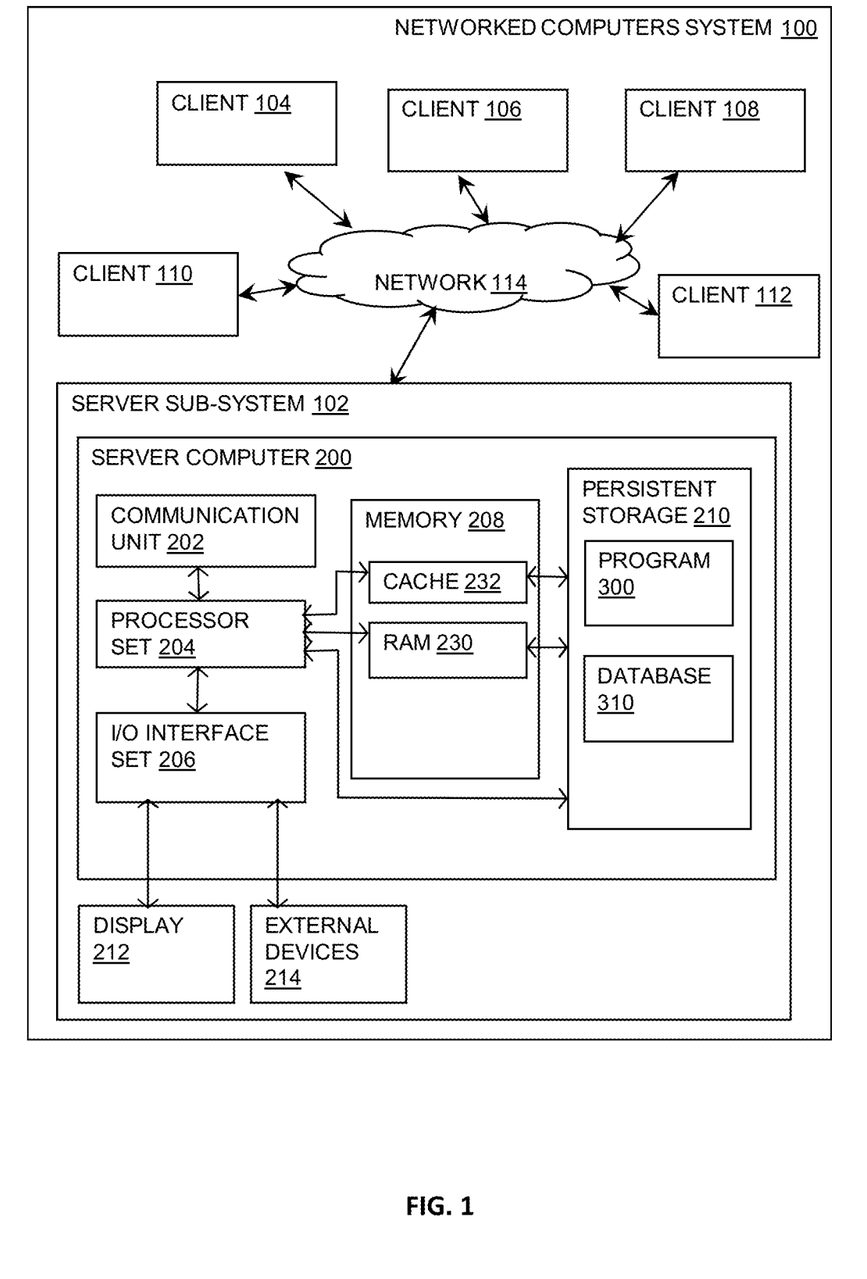
FIG. 1 is a block diagram view of a first embodiment of a system, according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; program 300; and database/library 310.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database), for example, to provide for generating, updating, storing, and/or using digital twin (e.g., digital replica) models and associated data. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Database and/or digital twin (e.g., digital replica) model library 310 may include substantive data associated with a plurality of digital twin models and may be accessed, for example by program 300, in generating, updating, and/or using one or more digital twin models.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
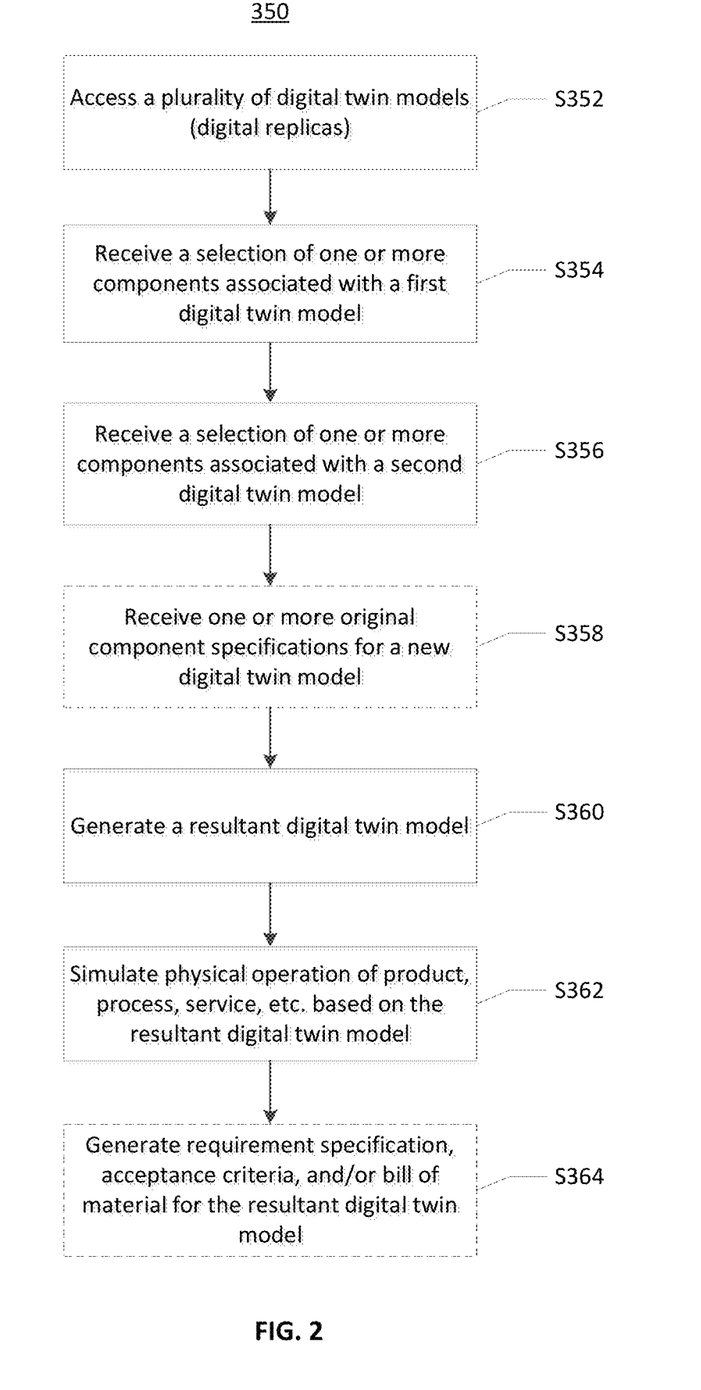
FIG. 2 is a flowchart showing a first embodiment method performed, at least in part, by the first embodiment system.

FIG. 2 shows flowchart 350 depicting a method of providing a resultant digital twin (e.g., digital replica) model, a virtual/digital replica or representation of a physical entity (e.g., object, process, or service), according to an embodiment of the present invention. Regarding FIG. 2, one or more flowchart blocks may be identified with dashed lines and represent optional steps that may additionally be included, but which are not necessarily required, in the depicted embodiments. As illustrated in FIG. 2, in some embodiments, processing begins at operation S352, where a plurality of digital twin models (e.g., digital replicas of physical objects, processes, or services, etc.) are accessed. For example, as described herein, a digital twin model library, such as digital twin model library 310 of FIG. 1, may comprise a plurality of digital twin models along with associated data (e.g., model components, bill of materials, capabilities, features, functionality, etc.). In some embodiments, a digital twin model library may be hosted via a cloud-based service. The digital twin models comprise digital replicas or representations of physical-world products, processes, services, and/or the like which can enable modeling, simulations, testing, monitoring, and/or the like of such products, processes, services, etc.

A digital twin (e.g., digital replica) model library (e.g., digital twin model library 310) can provide for interaction with stored digital twin models and/or selection of components (e.g., portions, units, modules, devices, capabilities, features, functionalities, etc.) of stored digital twin models. For example, a digital twin computing system (e.g., server sub-system 102, etc.) may be connected to the digital twin model library to provide access (e.g., navigation, review, selection, etc.) for the plurality of stored digital twin models. In some embodiments, a user (e.g., designer, etc.) may access the digital twin computing system/digital twin model library (e.g., via one or more user interfaces, etc.) to interact with the stored digital twin models while considering the specified requirements for a product, process, service, etc. to be modeled. A digital twin computing system may provide for one or more user interfaces for interaction with stored digital twin models and/or generation of resultant digital twin models, such as a two-dimensional display interface, a three-dimensional display interface, a virtual reality display interface, and/or the like.

Processing proceeds to operation S354, where a selection of components associated with a first stored digital twin model is received. For example, in some embodiments, the digital twin computing system may receive (e.g., from a designer via a user interface) data associated with the selection of one or more components (e.g., portions, units, modules, devices, capabilities, features, functionalities, etc.) of a first stored digital twin model that are desired for a new digital twin model that is to be generated (e.g., resultant digital twin model) that meets requirements for a specified product, process, service, etc. to be modeled. A designer can interact with a plurality of stored digital twin models to consider and/or select model components that may meet specified needs in a product, process, service, etc. to be modeled by a new digital twin model (e.g., resultant digital twin model). As an example, a designer may wish to create a digital twin model for a new product, such as a vehicle. The designer may wish to create the digital twin model to simulate and/or test aspects of the proposed vehicle design prior to finalizing manufacturing of the new product. The designer may review various stored digital twin models (e.g., stored in a digital twin model library 310, etc.) through use of a digital twin computing system (e.g., server subsystem 102, etc.). The designer may select one or more components (e.g., features, functionalities, etc.), for example, rotation speed, power generation capacity, and/or the like, from a first stored digital twin model, such as from an existing digital twin model of a turbine.

Processing proceeds to operation S356, where a selection of components (e.g., portions, units, modules, devices, capabilities, features, functionalities, etc.) associated with a second stored digital twin model is received. For example, the designer may review the stored digital twin models to discover additional components that are desired for the resultant digital twin model to be generated. The designer may review a second stored digital twin model, such as an existing digital twin model of a battery. The designer may select one or more components of the second stored digital twin model, for example, a power storage capability of the battery that is desired for the resultant digital twin model of the new product to be simulated, tested, and/or the like. In some embodiments, the designer may continue to review additional stored digital twin models to select additional components that are desired for the resultant digital twin model to be generated.

Optionally, in some embodiments, processing may continue to operation S358 where the digital twin computing system may receive specifications for one or more new/original components for a desired product, process, service, etc. to be modeled. The specifications for one or more new/original components may be used along with data associated with the selected components from the stored digital twin models in generating the new digital twin model for a desired product, process, service, etc. (e.g., resultant digital twin model). For example, in some embodiments, the designer may have design specifications for components desired for the new product that may not be included in existing stored digital twin models of the digital twin model library. As an example, some desired components (e.g., components having particular specifications, specialized components, etc.) may not be included in the digital twin models that are available to the designer for review and selection. These original component specifications may be provided to the digital twin computing system to be used, along with the selected components from the first and second stored digital twin models, in generating the resultant digital twin model.

Processing proceeds to operation S360, where a resultant digital twin model is generated based on the selection of components from the stored digital twin models, and optionally, the specifications for one or more new/original components. In some embodiments, the digital twin computing system may aggregate the selected model components and merge or adapt some or all of the various components with regard to one another to generate a resultant digital twin model which can provide for the specified needs, functionality, and/or purpose for the desired product, process, or service to be modeled. As an example, the designer may have provided selections of components from two or more stored digital twin models, such as the rotation speed, power generation capacity, and/or the like, from the first stored digital twin model of a turbine and the power storage capability from the second stored digital twin model of a battery. In response to the selections, the digital twin computing system can aggregate, adapt, and/or merge the selected components from the stored digital twin models and generate a resultant digital twin model as a replica/representation of the desired physical entity (e.g., product, process, service, etc.) based at least in part on data associated with the selected components from the stored digital twin models. In some embodiments, the digital twin computing system can further use provided specifications of original component(s), such as vehicle handling capabilities, operational restraints, service conditions, and/or the like, along with the selected components from the stored digital twin models when generating the resultant digital twin model.

Processing proceeds to operation S362, where the digital twin computing system provides for simulating operation of the product, process, service, etc. based on the resultant digital twin model. In some embodiments, the digital twin computing system can identify the aggregated capabilities of the resultant digital twin model and simulate how the resultant digital twin model will perform in relation to the specified needs, functionality, and/or purpose of the desired product, process, or service. For example, the digital twin computing system may simulate operation of the resultant digital twin model and generate performance data and/or the like for the desired product, process, or service. The simulation can provide for identifying if the modeled product, process, or service will meet the specified requirements (e.g., needs, functionalities, etc.) identified by the designer, identifying any problematic scenarios, identifying boundary conditions for the resultant digital twin model, and/or the like.

Optionally, in some embodiments, processing may continue to operation S364 where one or more of a requirements specification, acceptance criteria, and/or a bill of material for the resultant digital twin model may be generated. For example, in some embodiments, the digital twin computing system may generate a requirements specification identifying the components, functionality, operational conditions, and/or the like for the product, process, or service modeled by the resultant digital twin model. Additionally, the digital twin computing system may generate user acceptance criteria for the desired product, process, or service based on the specified requirements, features, and/or functionality of the resultant digital twin model. Further, the digital twin computing system may generate a bill of material for the resultant digital twin model based on the model components, for example, to use in development of the product, process, or service.

In some embodiments, the digital twin computing system may provide for receiving data indicative of one or more changes to be made to the resultant digital twin model based in part on the operation simulation for the resultant digital twin model. For example, one or more changes to the product, process, or service may be identified based on performance of the model in relation to the desired needs and/or functionality of the product, process, or service. The digital twin computing system may then provide for altering one or more components of the resultant digital twin model based on the received change data.

Figure 3:
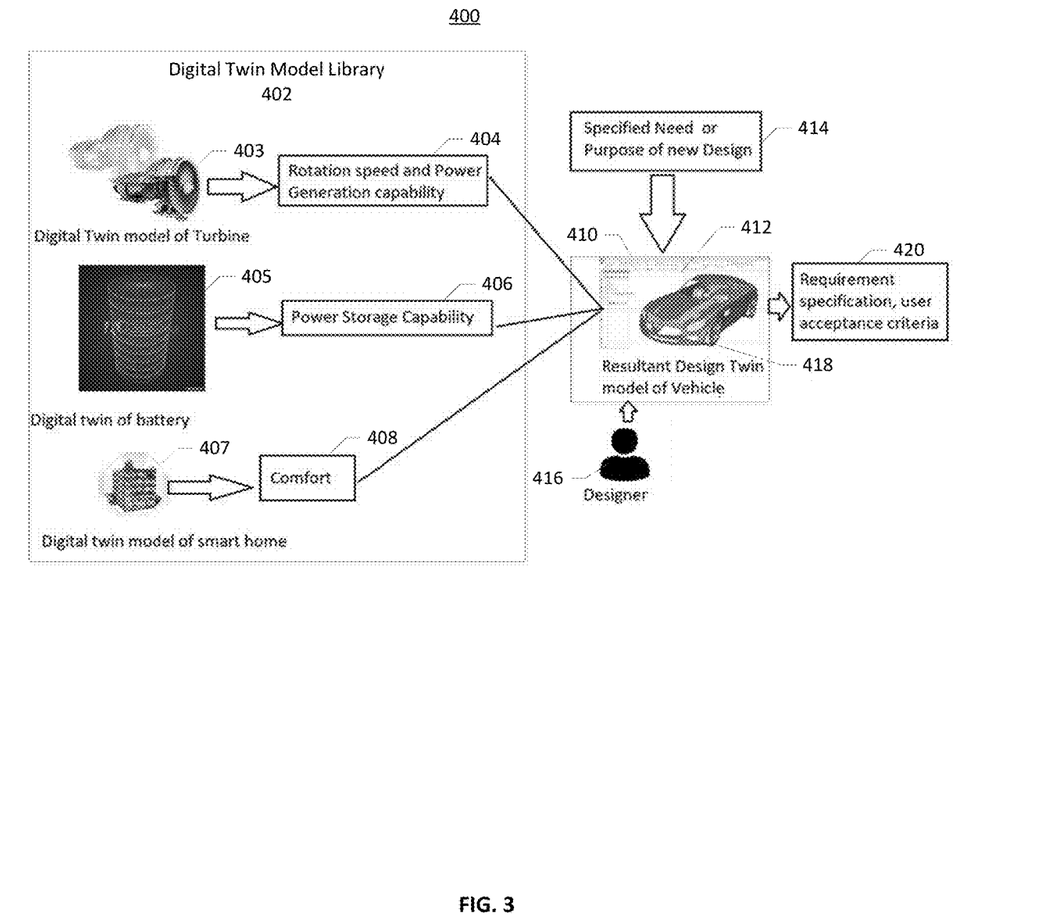
FIG. 3 is a block diagram showing an embodiment of a system for providing a resultant digital twin model according to the present invention.

FIG. 3 illustrates a block diagram showing an embodiment of a digital twin model system 400 for generating a resultant digital twin model from two or more stored digital twin models according to the present invention. As described herein, system 400 can provide for a user (e.g., designer 416) to selectively identify components from different stored digital twin models and adapt the selected components to generate a resultant digital twin model which can meet specified needs, functionality, and/or purpose for a new product, process, or service design. As illustrated in FIG. 3, in some embodiments, a digital twin model system 400 may comprise a digital twin computing system 410 (e.g., server sub-system 102, etc.) and include and/or be associated with a digital twin model library 402. The digital twin model library 402 comprises a plurality of stored digital twin models for products, processes, services, and/or the like (e.g., digital twin models 403, 405, and 407). The digital twin models may comprise digital replicas of physical-world products, processes, services, and/or the like which can enable modeling, simulation, testing, monitoring, and/or the like of such products, processes, services, etc. Additionally, the digital twin model library 402 may store various data (e.g., model components, bill of materials, capabilities, features, functionality, etc.) in association with the digital twin models. In some embodiments, the digital twin model library 402 and/or digital twin computing system 410 can correlate a bill of materials with different components of a model. In some embodiments, the digital twin model library 402 may be provided via a cloud-based service.

A digital twin model library 402 and/or digital twin computing system 410 can provide for interaction with stored digital twin models (e.g., digital twin models 403, 405, and 407), including review and/or selection of components (e.g., portions, capabilities, features, functionalities, etc.) of the stored digital twin models, such as component 404 of model 403, component 406 of model 405, and component 408 of model 407, to provide for generation of new digital twin models (e.g., resultant digital twin model 418, etc.). For example, a digital twin computing system 410 may be connected to or associated with the digital twin model library 402 to provide access (e.g., navigation, review, selection, etc.) for the plurality of stored digital twin models. In some embodiments, a user (e.g., designer 416, etc.) may access the digital twin computing system 410/ digital twin model library 402 (e.g., via one or more user interfaces 412, etc.) to interact with the stored digital twin models (e.g., select model components, etc.) while considering the specified requirements for a product, process, service, etc. to be modeled by a new resultant digital twin model. A digital twin computing system 410 may provide for one or more user interfaces (e.g., interface 412) for interaction with stored digital twin models (e.g., digital twin models 403, 405, and 407) and/or digital twin model components (e.g., components 405, 406, 408, etc.), such as a two-dimensional display interface, a three-dimensional display interface, a virtual reality display interface, and/or the like.

The digital twin computing system 410 can provide for receiving design specification data 414, for example, descriptive of a need/purpose, operational conditions, service life, and/or the like for the new design modeled by the resultant digital twin model 418. The digital twin computing system 410 (e.g., via interface 412) can also provide for receiving original component specifications (e.g., components other than those selected from stored digital twin models) to be used in generation of the resultant digital twin model 418. The interface 412 may provide for displaying the components selected from stored digital twin models as well as any original components to be provided in the resultant digital twin model.

The digital twin computing system 410 can provide for aggregating the selected components from multiple stored digital twin models (e.g., components 405, 406, 408, etc.), as well as any specified original components for use in generating a resultant digital twin model 418. The digital twin computing system 410 can adapt the selected components and/or original components to generate the resultant digital twin model 418, for example, based on the design specification data 414. As an example, in generating the resultant digital twin model, the digital twin computing system 410 may adjust one or more components to allow for operability between components and/or to accommodate the current need/purpose for the new model (e.g., adjust functionalities, dimensions, capacities, etc.).

Once then resultant digital twin model 418 is generated, the digital twin computing system 410 can store the resultant digital twin model 418 at the digital twin model library 402. The digital twin computing system 410 can provide for simulating, testing, and/or the like for operation of the resultant digital twin model 418. The digital twin computing system 410 can provide for simulating operation under varying operating conditions, such as environmental parameters, mode of operation, user skill level, and/or the like. The digital twin computing system 410 can provide for identifying boundary conditions, performance issues, projected service life, and/or the like for the modeled design based on operation simulations. In some embodiments, the digital twin computing system 410 may identify changes in projected service life based on different operational conditions. The digital twin computing system 410 can further identify, generate, and/or store model design data 420, which may include a requirement specification, user acceptance criteria, boundary conditions, bill of materials, operational conditions, service life, and/or the like (e.g., for production/ implementation of the modeled product, process. service, etc.). In some embodiments, the digital twin computing system 410 can further provide for alteration of the resultant digital twin model, for example, based on simulations, designer input, and/or the like.

Some embodiments may provide for using one or more Internet of Things (IoT) devices as components of the resultant digital twin model 418. In such embodiments, the digital twin computing system 410 may provide for identifying IoT device types, configurations, specifications, modifications, enhancements, and/or the like to be provided for the product, process, or service modeled by the resultant digital twin model 418, for example, based on the operational conditions and/or service life. In some embodiments, the digital twin computing system 410 may identify enhancements and/or modifications to provide compatibility between IoT devices and/or other components in a product, process, or service modeled by the resultant digital twin model 418. As an example, the digital twin computing system 410 may identify performance issues (e.g., bottleneck, etc.) and indicate modifications/enhancements to IoT devices to resolve the performance issues under specified operational conditions and/or service life. In some embodiments, the digital twin computing system 410 may validate compatibility of other devices with the enhanced/modified IoT device(s). In some embodiments, the digital twin computing system 410 may determine a projected service life for the IoT device(s) based on the operational conditions, the IoT device modifications, and the like.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    accessing a plurality of digital replica models, wherein a digital replica model provides a digital replica of a physical entity, wherein the physical entity is one of a product, a process, and a service;
    receiving from a user a selection of first components of a first digital replica model, wherein the first components include portions, units, modules, devices, capabilities, features, and functionalities of the first digital replica model;
    receiving from the user a selection of second components of a second digital replica model, wherein the second components include portions, units, modules, devices, capabilities, features, and functionalities of the second digital replica model;
    generating a resultant digital replica model as a digital replica of a desired physical entity, by aggregating first selected components of the first digital replica model and second selected components of the second digital replica model;
    adjusting the first selected components and the second selected components, to allow for operability between the first selected components and the second selected components and to accommodate current needs for the resultant digital replica model; and
    simulating operations of the desired physical entity based on the resultant digital replica model under varying operating conditions and generating performance data for the desired physical entity.

2. The computer-implemented method of claim 1 further comprising receiving a plurality of original component specifications wherein generation of the resultant digital replica model is further based on the plurality of original component specifications.

3. The computer-implemented method of claim 1 wherein the plurality of digital replica models are stored in a digital replica model library and the digital replica model library further stores a bill of materials for each digital replica model.

4. The computer-implemented method of claim 1 further comprising creating a requirement specification, acceptance criteria, and bill of materials for the resultant digital replica model based, at least in part, on bills of materials for the first digital replica model and the second digital replica model and the selection of the first components of the first digital replica model and the selection of the second components of the second digital replica model.

5. The computer-implemented method of claim 1 further comprising:
    receiving data indicative of one or more changes to the resultant digital replica model based in part on simulation of physical operation of the resultant digital replica model; and
    modifying the resultant digital replica model based on the received data indicative of one or more changes.

6. The computer-implemented method of claim 1 further comprising identifying aggregate capabilities for the resultant digital replica model.

7. A computer program product for providing a resultant digital replica model, the computer program product comprising a computer readable storage medium having stored thereon:
    program instructions programmed to access a plurality of digital replica models, wherein a digital replica model provides a digital replica of a physical entity, wherein the physical entity is one of a product, a process, and a service;
    program instructions programmed to receive from a user a selection of first components of a first digital replica model, wherein the first components include portions, units, modules, devices, capabilities, features, and functionalities of the first digital replica model;
    program instructions programmed to receive from the user a selection of second components of a second digital replica model, wherein the second components include portions, units, modules, devices, capabilities, features, and functionalities of the second digital replica model;
    program instructions programmed to generate a resultant digital replica model as a digital replica of a desired physical entity, by aggregating first selected components of the first digital replica model and second selected components of the second digital replica model;
    program instructions programmed to adjust the first selected components and the second selected components, to allow for operability between the first selected components and the second selected components and to accommodate current needs for the resultant digital replica model; and
    program instructions programmed to simulate operations of the desired physical entity based on the resultant digital replica model under varying operating conditions and generate performance data for the desired physical entity.

8. The computer program product of claim 7, the computer readable storage medium having further stored thereon program instructions programmed to receive a plurality of original component specifications wherein generation of the resultant digital replica model is further based on the plurality of original component specifications.

9. The computer program product of claim 7 wherein the plurality of digital replica models are stored in a digital replica model library and the digital replica model library further stores a bill of material for each digital replica model.

10. The computer program product of claim 7, the computer readable storage medium having further stored thereon program instructions programmed to create a requirement specification, acceptance criteria, and bill of material for the resultant digital replica model based, at least in part, on bills of materials for the first digital replica model and the second digital replica model and the selection of the first components of the first digital replica model and the selection of the second components of the second digital replica model.

11. The computer program product of claim 7, the computer readable storage medium having further stored thereon:
   program instructions programmed to receive data indicative of one or more changes to the resultant digital replica model based in part on the simulation of physical operation of the resultant digital replica model; and
   program instructions programmed to modify the resultant digital replica model based on the received changes data.

12. The computer program product of claim 7, the computer readable storage medium having further stored thereon program instructions programmed to identify aggregate capabilities for the resultant digital replica model.

13. A computer system for providing a resultant digital replica model, the computer system comprising:
   a processor set; and
   a computer readable storage medium;
   wherein:
      the processor set is structured, located, connected and programmed to run program instructions stored on the computer readable storage medium; and
      the stored program instructions include:
         program instructions programmed to access a plurality of digital replica models, wherein a digital replica model provides a digital replica of a physical entity, wherein the physical entity is one of a product, a process, and a service;
         program instructions programmed to receive from a user a selection of first components of a first digital replica model, wherein the first components include portions, units, modules, devices, capabilities, features, and functionalities of the first digital replica model;
         program instructions programmed to receive from the user a selection of second components of a second digital replica model, wherein the second components include portions, units, modules, devices, capabilities, features, and functionalities of the second digital replica model;
         program instructions programmed to generate a resultant digital replica model as a digital replica of a desired physical entity, by aggregating first selected components of the first digital replica model and second selected components of the second digital replica model;
         program instructions programmed to adjust the first selected components and the second selected components, to allow for operability between the first selected components and the second selected components and to accommodate current needs for the resultant digital replica model; and
         program instructions programmed to simulate operations of the desired physical entity based on the resultant digital replica model under varying operating conditions and generate performance data for the desired physical entity.

14. The computer system of claim 13 wherein the stored program instructions further comprise program instructions programmed to receive a plurality of original component specifications wherein the generation of the resultant digital replica model is further based on the plurality of original component specifications.

15. The computer system of claim 13 wherein the plurality of digital replica models are stored in a digital replica model library and the digital replica model library further stores a bill of material for each digital replica model.

16. The computer system of claim 13 wherein the stored program instructions further comprise program instructions programmed to create a requirement specification, acceptance criteria, and bill of material for the resultant digital replica model.

17. The computer system of claim 13 wherein the stored program instructions further comprise:
   program instructions programmed to receive data indicative of one or more changes to the resultant digital replica model based in part on the simulation of physical operation of the resultant digital replica model; and
   program instructions programmed to modify the resultant digital replica model based on the received changes data.

* * * * *